(12) United States Patent
Dakowski et al.

(10) Patent No.: US 8,100,635 B2
(45) Date of Patent: Jan. 24, 2012

(54) CONTROL OF CLEARANCE AT BLADE TIPS IN A HIGH-PRESSURE TURBINE OF A TURBINE ENGINE

(75) Inventors: Mathieu Dakowski, Sucy En Brie (FR); Claire Dorin, Maisons-Alfort (FR); Alain Dominique Gendraud, Vernou la Celle sur Seine (FR); Nicolas Pommier, Brunoy (FR)

(73) Assignee: SNECMA, Paris (FR)

( * ) Notice: Subject to any disclaimer, the term of this patent is extended or adjusted under 35 U.S.C. 154(b) by 667 days.

(21) Appl. No.: 12/254,518

(22) Filed: Oct. 20, 2008

(65) Prior Publication Data

US 2009/0104026 A1   Apr. 23, 2009

(30) Foreign Application Priority Data

Oct. 22, 2007 (FR) ..................... 07 07356

(51) Int. Cl.
*F01D 5/14* (2006.01)
*F03D 11/00* (2006.01)
*F04D 29/38* (2006.01)
(52) U.S. Cl. ......... 415/115; 415/116; 415/177; 415/180
(58) Field of Classification Search ............. 415/114, 415/115, 116, 177, 180, 173.1
See application file for complete search history.

(56) References Cited

U.S. PATENT DOCUMENTS

| 3,430,405 | A | | 3/1969 | Alder et al. |
| 4,525,998 | A | * | 7/1985 | Schwarz ................... 60/226.1 |
| 4,565,492 | A | * | 1/1986 | Bart et al. ................. 415/175 |
| 4,642,024 | A | * | 2/1987 | Weidner ................... 415/116 |
| 4,826,397 | A | * | 5/1989 | Shook et al. .............. 415/116 |
| 5,176,495 | A | | 1/1993 | Honkomp et al. |
| 5,238,365 | A | * | 8/1993 | Petsche ..................... 415/178 |
| 6,918,739 | B2 | * | 7/2005 | Addis ............................ 415/1 |

FOREIGN PATENT DOCUMENTS

| DE | 197 34216 A1 | 2/1998 |
| EP | 0 327 056 A2 | 8/1989 |
| EP | 1 045 115 A1 | 10/2000 |
| FR | 2 407 342 | 5/1979 |
| FR | 2 416 345 | 8/1979 |
| FR | 2 428 141 | 1/1980 |

OTHER PUBLICATIONS

U.S. Appl. No. 12/994,969, filed Nov. 29, 2010, Gendraud, et al.

* cited by examiner

*Primary Examiner* — David Nhu
(74) *Attorney, Agent, or Firm* — Oblon, Spivak, McClelland, Maier & Neustadt, L.L.P.

(57) ABSTRACT

A turbine stage in a turbine engine, including a wheel with blades rotating inside a sealing ring held by a casing of the turbine, and an annular thermal protection sheet mounted between the casing and the sealing ring is disclosed. The annular thermal protection sheet is formed by a plurality of curved plates mounted end-to-end and attached by pins to the casing.

15 Claims, 5 Drawing Sheets

CONTROL OF CLEARANCE AT BLADE TIPS IN A HIGH-PRESSURE TURBINE OF A TURBINE ENGINE

CROSS-REFERENCE TO RELATED APPLICATIONS

The present application claims priority to and incorporates by reference the entire contents of FR 0707356 filed in France on Oct. 22, 2007.

This invention relates to a high-pressure turbine in a turbine engine, such as an airplane turbojet or turboprop engine.

BACKGROUND OF THE INVENTION

A turbine engine includes essentially a compressor, a combustion chamber and a turbine, in which the compressor supplies the combustion chamber with pressurised air, and the turbine receives the hot gases coming from the combustion chamber so as to extract energy therefrom. The stage of the turbine located immediately downstream of the combustion chamber, commonly called the high-pressure stage, includes a disk equipped with blades on its periphery and surrounded in general by a stationary sealing ring held by a casing.

The radial clearance between the tips of the blades and the sealing ring must be as low as possible in order to minimise the passage of pressurised air outside of the zone swept by the blades and thus prevent the turbine performance from being hindered, but this radial clearance must be sufficient to avoid any friction of the tips of the blades on the sealing ring.

The radial clearance between the tips of the blades and the sealing ring is dependent on the thermal and mechanical expansions of the rotor and the thermal expansion of the stator of the turbine, in particular its casing and the sealing ring.

During the various phases of operation of a turbine engine, the radial clearance may vary considerably due to the movements of elements comprising the rotor and the stator of the turbine, and especially as these movements may be in opposite directions and be distributed non-homogeneously about the spindle of the turbine engine.

In particular, during operating cycles commonly called critical re-accelerations, in which the turbine engine goes, in a very short time, from a stabilised full rate of speed to a slowed rate of speed, and then returns quickly to the full rate of speed, the radial clearance passes through a minimum value. Indeed, the movements due to thermal expansion of the rotor disk are slow during the passage from the full rate of speed to the slowed rate of speed due to the large mass of the disk and the resulting long thermal response time; as the mass of the elements of the stator is lower, their thermal response is faster. Thus, in a sudden re-acceleration to the full rate of speed, the radial clearance is low between the rotor, which has not yet had time to be thermally stabilised at the slowed rate of speed, and the stator, which was able to reach the operation conditions on slowing. The centrifugal force resulting from the acceleration causes an additional expansion of the rotor, correspondingly reducing the radial clearance and capable of causing premature wear of parts if the tips of the blades have come into contact with the sealing ring.

It therefore appears that the faster the thermal response of the stator elements with respect to the response of the rotor, the smaller the radial clearance is between the tips of the blades and the sealing ring during a re-acceleration cycle, and the greater the risk is of premature wear.

SUMMARY OF THE INVENTION

The invention is intended in particular to provide a simple, economical and effective solution to these problems, enabling the disadvantages of the prior art to be overcome.

It is intended in particular to slow the thermal response of the stator elements of a turbine stage in a turbine engine so as to limit the reductions in radial clearance between the tips of the mobile blades and the sealing ring surrounding these blades in the turbine upon re-acceleration.

It is intended more generally to make the movements of the stator elements homogeneous about the spindle of the turbine engine in order to limit the reductions in radial clearance at the blade tips.

It thus proposes a turbine stage in a turbine engine, including a wheel with blades rotating inside a sealing ring held by a casing of the turbine, and an annular thermal protection sheet mounted between the casing and the ring, wherein the annular thermal protection sheet is formed by a plurality of curved plates mounted end-to-end and attached by pins to the casing.

This annular thermal protection sheet makes it possible to improve the thermal insulation of the casing of the turbine so as to slow its thermal response and make the thermal expansion more homogeneous.

To facilitate the assembly of this sheet and thus reduce the costs of assembly and maintenance, the annular sheet is formed by at least two curved plates adjacently mounted and attached to the casing.

According to another feature of the invention, the pins are crimped in orifices of the casing, and advantageously include an external end of the casing, which end is crimped on a washer threaded onto the end of the pin and applied to the radially external face of the casing, in which the washer is preferably chamfered at its internal periphery and attached by at least one welding point to the casing.

The use of these washers makes it possible to prevent the casing from being damaged during crimping of the pins.

Advantageously, the pins are engaged in orifices of the curved plates and include, at their radially internal end, an annular edge supporting the edges of the orifices of the curved plates, so as to ensure proper attachment of these plates to the casing.

In a preferred embodiment of the invention, each curved plate is attached to the casing by three pins, of which one goes into a central orifice in the middle of the curved plate and the other two go into orifices at the ends of said curved plate. The central orifice at the middle of the curved plate has a dimension corresponding to the transverse dimension of the pin, and the orifice at each end of the plate has a dimension greater than the transverse dimension of the pin, for a sliding assembly of the plate on the pin in the circumferential direction.

The attachment by the central orifice of each plate makes it possible to lock the plate with respect to the casing, whereas the sliding assembly of the ends of the plates makes it possible to connect these ends to the casing while allowing a slight movement of the plates in the circumferential direction in order to take into account the fact that the thermal expansion of these plates is generally greater than that of the casing of the turbine, which is slightly colder than the plates.

One end of each plate forms or advantageously comprises a joint cover by which the corresponding end of the adjacent plate is connected, which joint cover comprises the orifice for passage of the attachment pin and is preferably attached by welding to the end of the curved plate.

This joint cover enables the orifices of two adjacent plates to be superimposed while preserving the alignment of these plates and therefore the general annular shape of the thermal protection sheet formed by said plates.

According to another feature of the invention, the radially internal portion of each pin is mounted in or forms a spacer maintaining the annular end edge of the pin at a determined distance from the casing, and the curved plates preferably comprise bosses projecting on their radially external face and forming punctiform or quasi-punctiform contacts on the casing.

The spacers associated with the bosses of the plates enable a sufficient gap to be provided between the annular thermal protection sheet and the casing, in order to produce an air space capable of improving the thermal insulation of the casing.

Moreover, the shape of the bosses is chosen so as to minimise the thermal exchange surface between the plates and the casing.

The invention relates in particular to a high-pressure turbine stage in a turbine engine.

The invention also relates to a turbine engine, such as a turbojet or a turboprop engine, wherein it includes a turbine stage of the type described above.

It also relates to curved plates intended to form an annular thermal protection sheet of the type described above.

BRIEF DESCRIPTION OF THE DRAWINGS

The invention can be better understood, and other details, advantages and features thereof will appear more clearly on reading the following description provided by way of a non-limiting example, in reference to the appended drawings in which.

DETAILED DESCRIPTION

Figure 1:
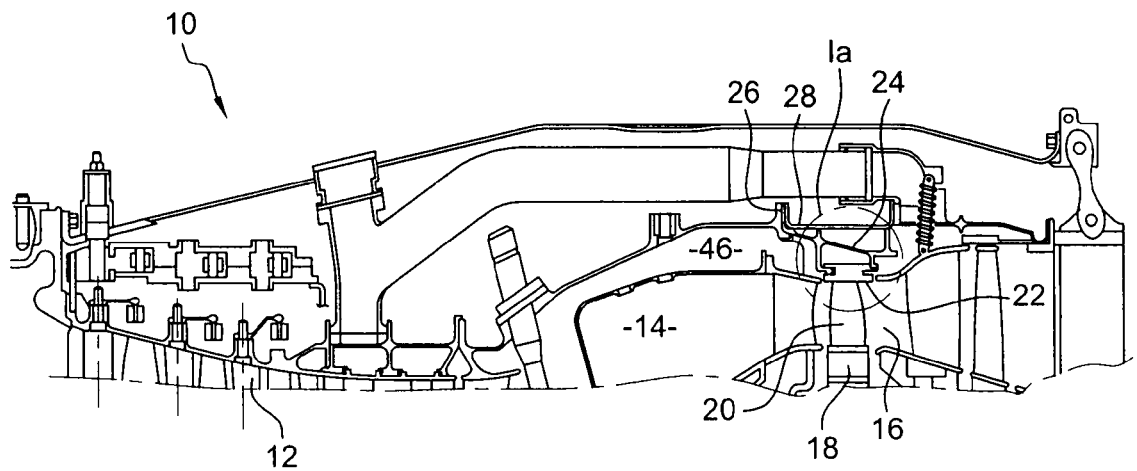
FIG. 1 is a partial diagrammatic axial cross-section view of a known type of turbine engine.

FIG. 1 shows a portion of a turbine engine 10 of a known type, including, upstream to downstream, a compressor 12, a combustion chamber 14, and a gas turbine 16.

The turbine 16 comprises a high-pressure stage located immediately downstream of the combustion chamber 14 and intended to receive a hot gas flow from the combustion chamber and to provide these gases to one or more low-pressure stages before ejection. The high-pressure stage includes a rotor mounted on a shaft to which a high-pressure compressor rotor is coupled, while the low-pressure stage includes a rotor mounted on a shaft to which a fan located at the inlet of the turbine engine is coupled.

The rotor of the high-pressure turbine stage includes a disk 18 with mobile blades 20 extending radially from the periphery of the disk 18 and intended to drive the rotor by the force of the gases from the combustion chamber 14.

The disk 18 is surrounded by a sealing ring 22, which is formed by a plurality of adjacent annular sections covered with a layer of abradable material on their radially internal face and which is held by a casing 24 of the turbine, itself connected by flanges 26 to an external casing 28. The sealing ring 22 is intended to limit the flow of gas outside of the area swept by the mobile blades 20 of the disk 18 so as to optimise the performance of the turbine.

Figure 1A:
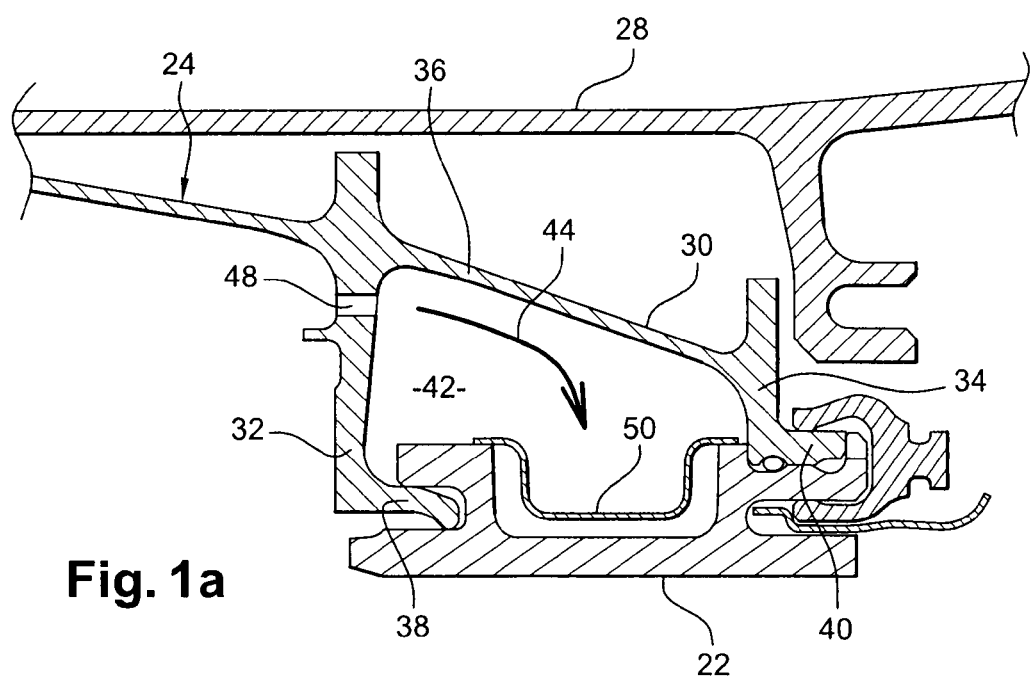
FIG. 1a is a larger scale partial view of detail Ia of FIG. 1.

As shown in FIG. 1a, the sections of the sealing ring 22 are supported by an annular portion 30 of the casing 24 with a substantially U-shaped cross-section, with two radial wings 32, 34 directed toward the inside of the turbine and a base 36. At their ends, the radial wings 32, 34 include axial edges 38, 40 for assembling sections of the sealing ring 22, in a manner known to a person skilled in the art.

The portion 30, with a U-shaped cross-section, of the casing 24 of the turbine and the sealing ring 22 form a cavity 42 for supplying the ring sections with cooling air 44 coming from a bypass space of the combustion chamber (designated by reference 46 in FIG. 1) and passing into an orifice 48 of the upstream radial wing.

In addition, the sections of the sealing ring 22 are covered with an impact sheet 50 arranged on their radially external face.

Figure 2:
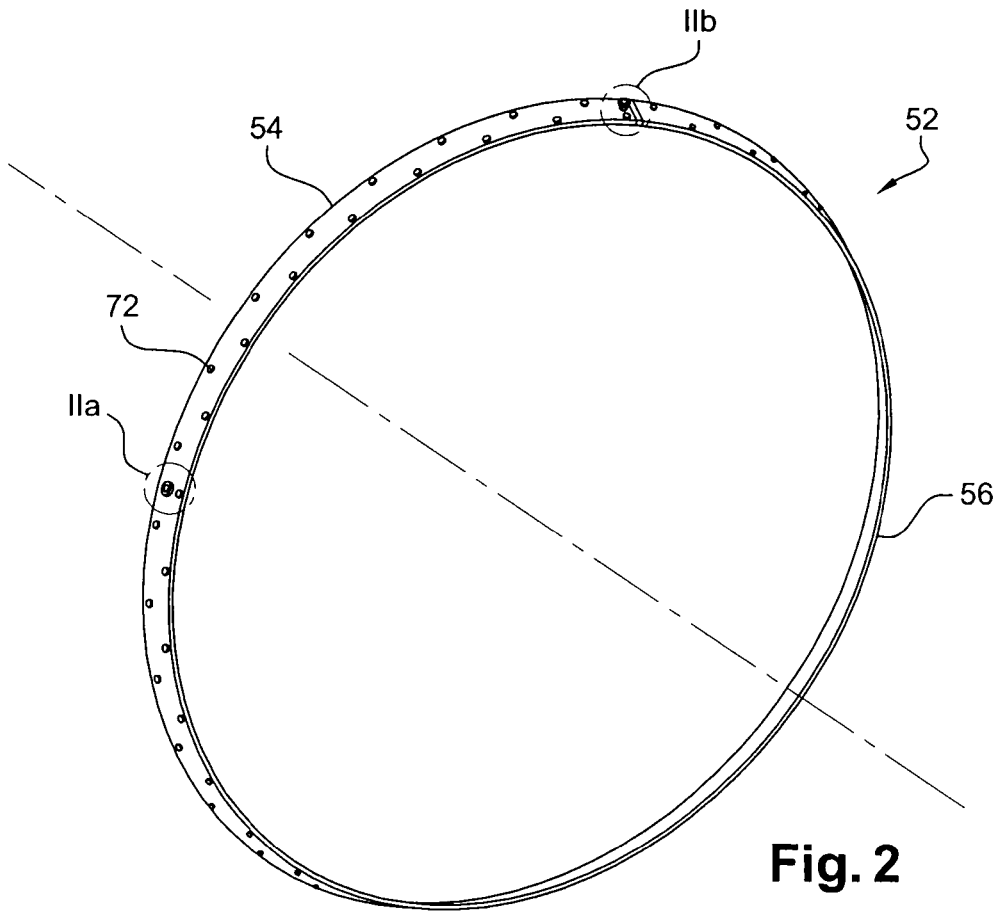
FIG. 2 is a diagrammatic perspective view of a thermal protection sheet according to the invention.

FIG. 2 shows an annular thermal protection sheet 52 according to the invention, intended to be attached by pins to the base 36 of the portion 30 of the casing of the turbine, inside the cavity 42 so as to slow the thermal response of the casing.

In the example shown, this thermal protection sheet 52 is formed by two semi-annular curved plates 54, 56, which are identical to one another.

Figure 2A:
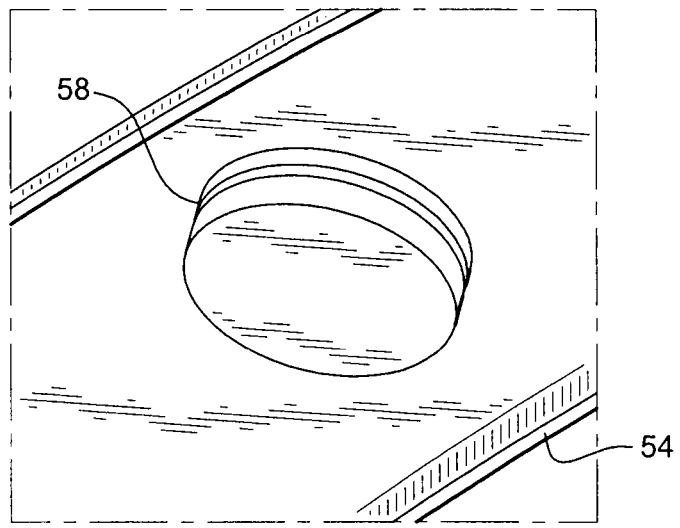
FIG. 2a is a larger scale view of detail IIa of FIG. 2.

Each curved plate 54, 56 has a central orifice 58 in its middle, shown on a larger scale in FIG. 2a, and intended for the passage of a pin for attaching the curved plate 54, 56 to the base 36, in which the orifice 58 has a dimension substantially equal to that of the pin so as to enable the plate 54, 56 to be locked with respect to the casing 24 of the turbine.

In addition, each curved plate 54, 56 comprises two oblong orifices substantially identical to one another, in which a first orifice is formed in the vicinity of one of the ends of the plate, while the other orifice is formed in a joint cover, which is welded to the other end of the curved plate.

The two curved plates are assembled to one another by causing the orifice of the joint cover of each plate to merge with the orifice of the end, not comprising a joint cover, of the other plate.

Figure 2B:
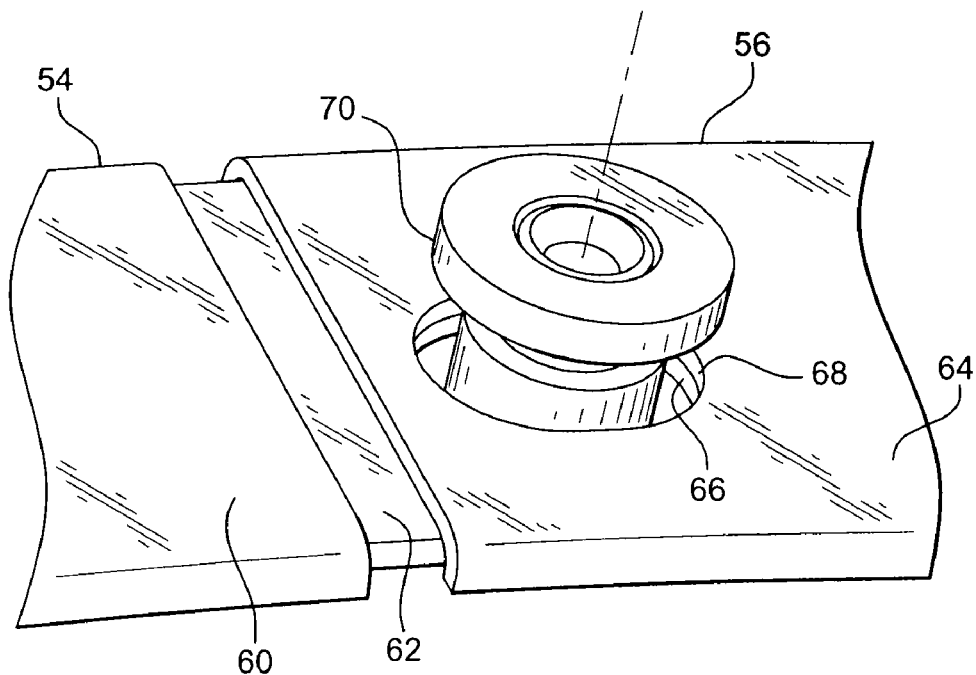
FIG. 2b is a larger scale view of detail IIb of FIG. 2.

FIG. 2b thus shows the end 60, equipped with a joint cover 62, of the curved plate 54, placed near the end 64, without a joint cover, of the other curved plate 56 so that the orifice of the joint cover 66 is aligned with the orifice 68 of the plate 56 so as to enable a pin 70 attached to the casing to pass through the two orifices 66 and 68. The oblong shape of these orifices allows for a sliding assembly of the ends 60, 64 of the plates on the turbine casing 24 by enabling a slight translation of each of the plates 54, 56 with respect to the attachment pins 70.

The curved plates 54, 56 comprise bosses or pins 72, projecting on their radially external face and intended to serve as substantially punctiform contacts on the base 36 of the portion 30 with a U-shaped cross-section of the turbine casing 24, so as to maintain an air space between the plates 54, 56 and the base 36.

Figure 3:
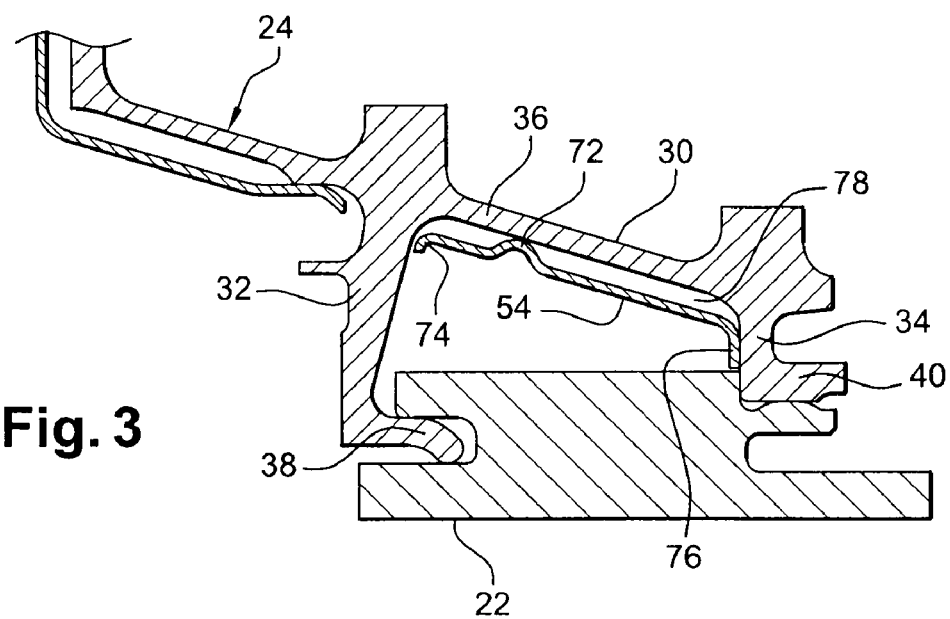
FIG. 3 is a partial diagrammatic axial cross-section view, according to a first cutting plane, of a turbine stage according to a first embodiment of the invention.

FIG. 3 shows a cross-section view similar to FIG. 1a and according to a plane passing through a pin 72 of the curved plate 54.

The plate 54 comprises edges 74, 76 curved toward the inside of the turbine and respectively in contact with the wings 32 and 34 of the portion 30 with a U-shaped cross section of the turbine casing 24, so as to ensure the sealing of the air space 78. The downstream edge 76 of the plate 54 also forms a leg for supporting and radially guiding the plate 54 on the sealing ring 22, intended to limit the vibrations of the curved plate 54.

The air space 78 produced between the base 36 and the curved plate 54 enables the thermal insulation of the turbine casing 24 to be optimised.

Figure 4:
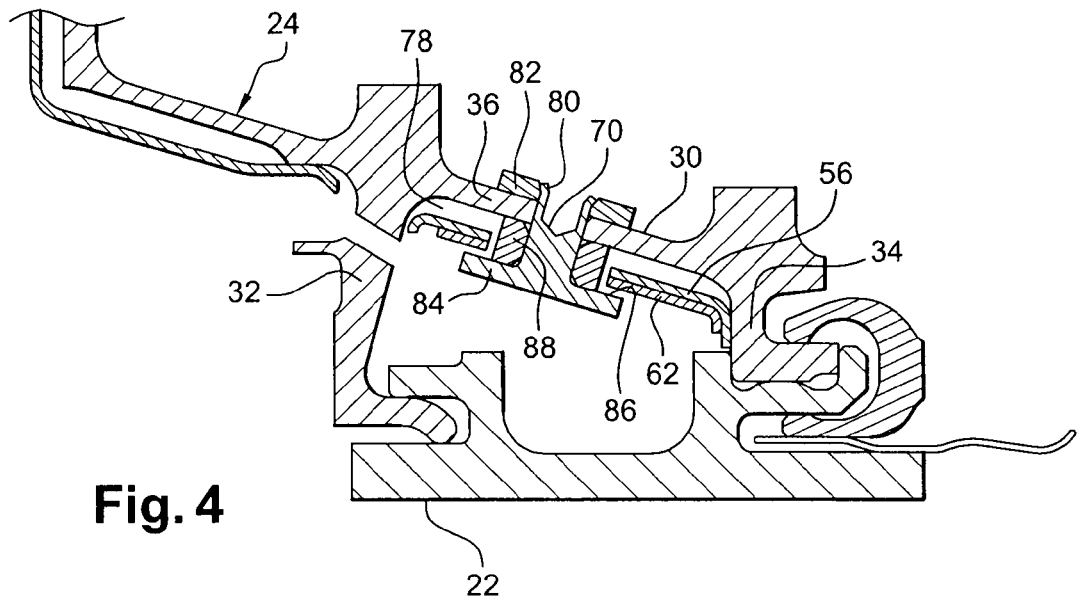
FIG. 4 is a diagrammatic partial axial cross-section view, according to a second cutting plane, of the turbine stage of FIG. 3.

FIG. 4 is a cross-section view similar to FIG. 3, but in a plane passing through the pin 70 engaged in the orifice of the end of the plate 56 and in the orifice of the joint cover 62 of the plate 54 in order to jointly attach the plates 54 and 56 to the base 36 of the portion 30 with the U-shaped cross-section of the casing 24.

The pin 70 includes a skirt of which the end 80 outside the turbine casing 24 is crimped on a washer 82 threaded on the end 80 of the skirt of the pin and applied or attached by at least one welding point to the radially external face of the base 36, which washer is chamfered at its internal periphery. The washer 82 enables damage of the casing 24 to be avoided when crimping the pin 70.

The pin 70 also includes, at its radially internal end, a head 84 of which the surface facing the outside of the turbine forms an annular edge 86 supporting the edge of the orifice of the joint cover 62.

In addition, the pin 70 is mounted in a spacer 88 that enables the pin to be prevented from touching the plate 56 and the joint cover 62, while maintaining the annular edge 86 of the head 84 of the pin at a determined distance from the base 36 of the portion 30 with a U-shaped cross-section of the casing 24, so as to ensure a sufficient gap for the air space 78.

Figure 5:
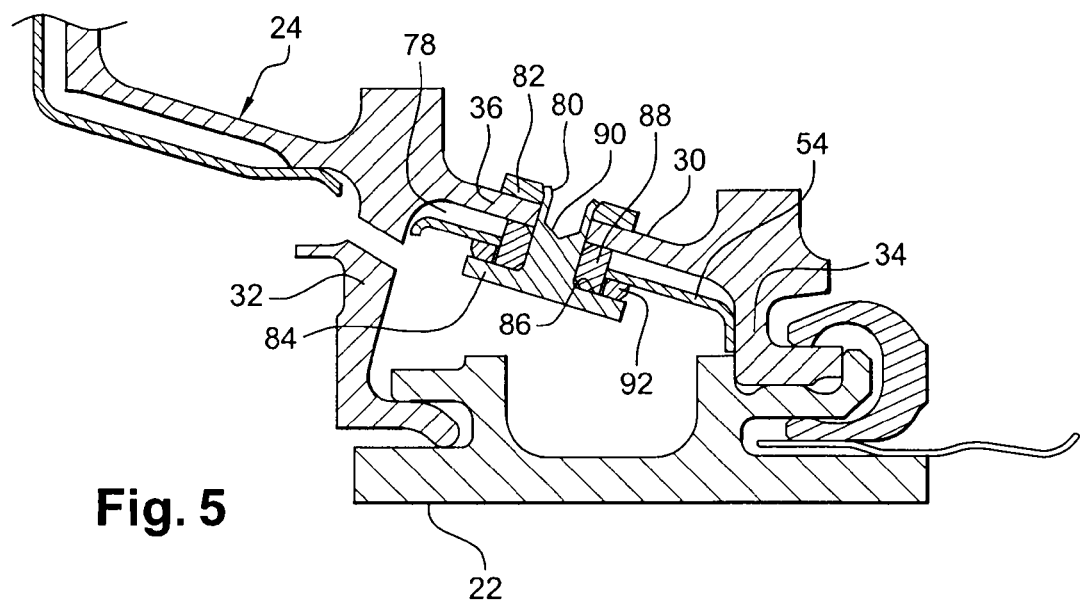
FIG. 5 is a diagrammatic partial axial cross-section view, according to a third cutting plane, of the turbine stage of FIG. 3.

FIG. 5 is a cross-section view similar to FIG. 3, but in a plane passing through a pin 90 engaged in the central orifice 58 of the middle of the plate 54 in order to attach said plate to the base 36.

As the pin 90 is of the same type as the pin 70 described above, in particular so as to reduce the production costs, an additional washer 92, with a thickness substantially equal to the thickness of the joint cover 62, is inserted between the edge of the orifice 58 of the plate 54 and the annular edge 86 of the pin 90 in order to compensate for the absence of a joint cover at the level of the central attachment of the curved plate.

Figure 6:
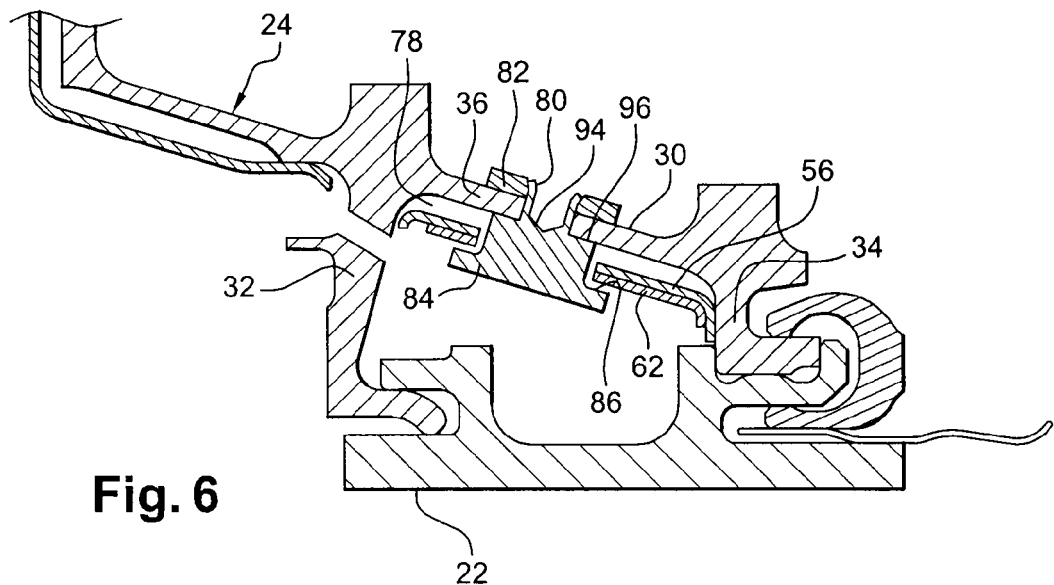
FIG. 6 is a diagrammatic partial axial cross-section view, according to the second cutting plane, of a second embodiment of the invention.
Figure 7:
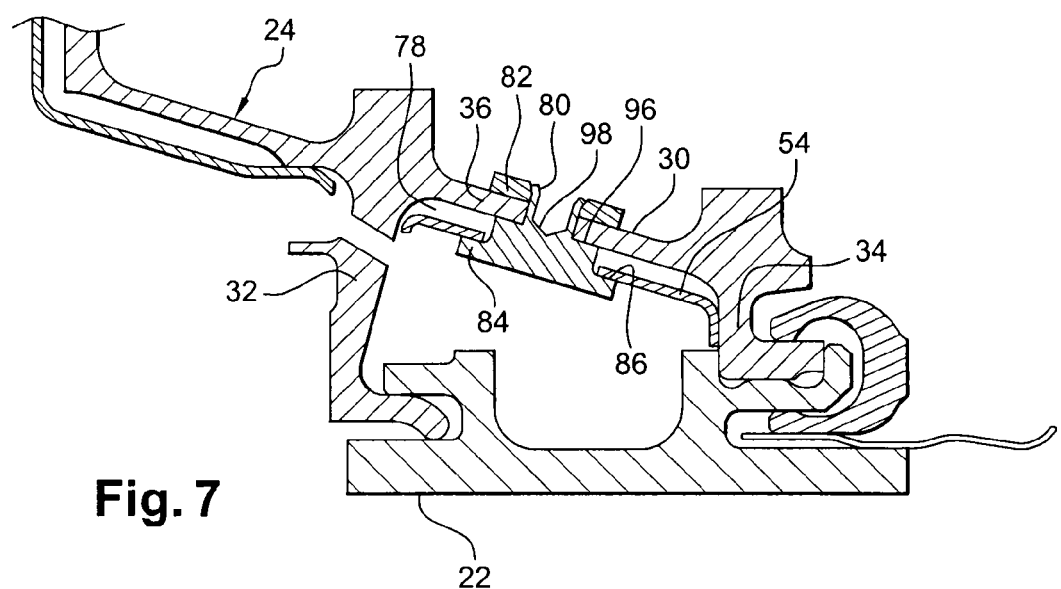
FIG. 7 is a diagrammatic partial axial cross-section view, according to the third cutting plane, of the turbine stage of FIG. 6.

Alternatively, the spacers can be formed by the attachment pins themselves, as shown in FIGS. 6 and 7.

In FIG. 6, which shows, as in FIG. 4, a joint attachment of the plates 54 and 56 to the casing 24, the pin 94 comprises a shoulder 96 forming a contact edge of the pin on the radially internal face of the base 36 of the portion 30 with a U-shaped cross-section of the casing 24 of the turbine. The portion of the pin 94 contained between this shoulder 96 and the head 84 of the pin thus acts as a spacer to maintain the gap and the air space 78 produced in this gap.

Concerning the attachment of the plates at their middle, the same pin 94 can be used jointly with a washer 92, as in the alternative with the spacer shown in FIG. 5.

FIG. 7 shows another alternative in which a pin 98 of the same type as the pin 94, but with a length shorter than that of said pin 94 is used so as to avoid the need for a washer to compensate for the lack of a joint cover.

In general, the annular thermal protection sheet 52 according to the invention includes two curved plates to enable its assembly inside the annular portion 30 with a U-shaped cross-section of the turbine casing 24.

The sliding assembly of the ends of the curved plates makes it possible to take into account differential thermal expansion phenomena, as the curved plates generally have a tendency to undergo greater expansion than the turbine casing supporting them.

The thermal protection sheet according to the invention enables the thermal response of the turbine casing to be slowed so that the reductions in the radial clearance between the tips of the mobile blades and the sealing ring surrounding these blades in the turbine upon re-acceleration remain low enough to prevent contact between the tips of the mobile blades and the sealing ring.

The invention claimed is:

1. A turbine stage in a turbine engine, including a wheel with blades rotating inside a sealing ring held by a casing, and an annular thermal protection sheet mounted between the casing and the sealing ring, wherein the annular thermal protection sheet is formed by a plurality of curved plates mounted end-to-end and attached by pins to the casing.

2. The turbine stage according to claim 1, wherein the pins are crimped in orifices of the casing.

3. The turbine stage according to claim 2, wherein the pins include an end outside the casing, which end is crimped on a washer threaded onto the end of the pin and applied to the radially external face of the casing.

4. The turbine stage according to claim 3, wherein the washer is chamfered at its internal periphery and attached by at least one welding point to the casing.

5. The turbine stage according to claim 1, wherein the pins are engaged in orifices of the curved plates and include, at their radially internal end, an annular edge supporting the edges of the orifices of the curved plates.

6. The turbine stage according to claim 5, wherein each curved plate is attached to the casing by three pins, of which one goes into a central orifice in the middle of the curved plate and the other two go into orifices at the ends of the curved plate.

7. The turbine stage according to claim 6, wherein the central orifice at the middle of the curved plate has a dimension corresponding to the transverse dimension of the pin, and the orifice at each end of the plate has a dimension greater than the transverse dimension of the pin, for a sliding assembly of the plate on the pin in the circumferential direction.

8. The turbine stage according to claim 7, wherein one end of each plate forms a joint cover by which the corresponding end of the adjacent plate is connected, which joint cover comprises the orifice for passage of the attachment pin.

9. The turbine stage according to claim 5, wherein the radially internal portion of each pin is mounted in or forms a spacer maintaining the annular end edge of the pin at a determined distance from the casing.

10. The turbine stage according to claim 1, wherein the curved plates comprise bosses projecting on their radially external face and forming punctiform or quasi-punctiform contacts on the casing.

11. A turbine engine, including a turbine stage according to claim 1.

12. Curved plates intended to form an annular thermal protection sheet in a turbine stage according to claim 1, wherein the curved plates include orifices for assembling attachment pins, in which each curved plate includes a central orifice at its middle and an orifice at each of its ends for assembling attachment pins, in which the central orifice of the middle of each curved plate has a dimension corresponding to the transverse dimension of an attachment pin, and the orifices of the ends of each plate have a dimension greater than the transverse dimension of a pin.

13. The curved plates according to claim 12, wherein an end of each plate forms or comprises a joint cover by which it can be connected to the corresponding end of an adjacent plate, in which the joint cover comprises the orifice for passage of an attachment pin.

14. The curved plates according to claim 13, wherein each joint cover is attached by welding to the end of the corresponding plate.

15. The curved plates according to claim 14, wherein they comprise bosses projecting from their external face.

* * * * *